United States Patent [19]

Lu et al.

[11] 4,031,912

[45] June 28, 1977

[54] REACTANTS ADDITION AND CONCENTRATION CONTROL SYSTEM

[75] Inventors: Shau-Zou Lu, Vestal; Henry Nowicki, Endwell, both of N.Y.

[73] Assignee: GAF Corporation, New York, N.Y.

[22] Filed: June 4, 1976

[21] Appl. No.: 692,688

[52] U.S. Cl. .................................. 137/5; 137/89; 137/93

[51] Int. Cl.² ........................................ G05D 11/08

[58] Field of Search .......................... 137/5, 89, 93

[56] References Cited

UNITED STATES PATENTS

| 3,195,551 | 7/1965 | Russell | 137/93 X |
| 3,376,883 | 4/1968 | Douty | 137/93 X |

Primary Examiner—Robert G. Nilson
Attorney, Agent, or Firm—Walter C. Kehm; Walter Katz

[57] ABSTRACT

A system for controlling the silver ion concentration of a silver halide emulsion made by mixing alkali halide and silver nitrate solutions which are delivered continuously to a vessel at primary addition rates. The silver ion concentration in the vessel is measured to establish the deviation from a desired concentration. Where the error is within a limited or normal range, a low signal selector circuit causes a pump in a secondary flow loop to deliver a secondary amount of whichever solution is needed to offset the deviation. Where the error is abnormal, a high signal selector circuit alters the primary addition rate of the alkali halide solution to offset the deviation.

17 Claims, 4 Drawing Figures

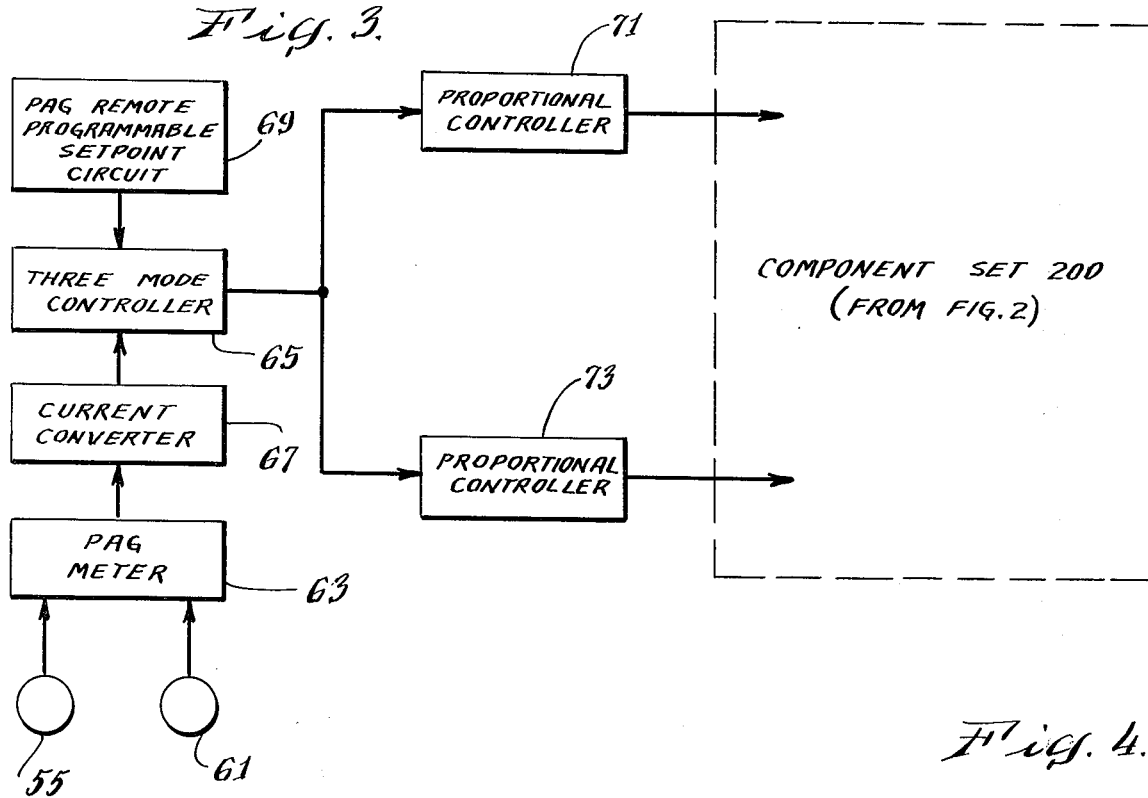
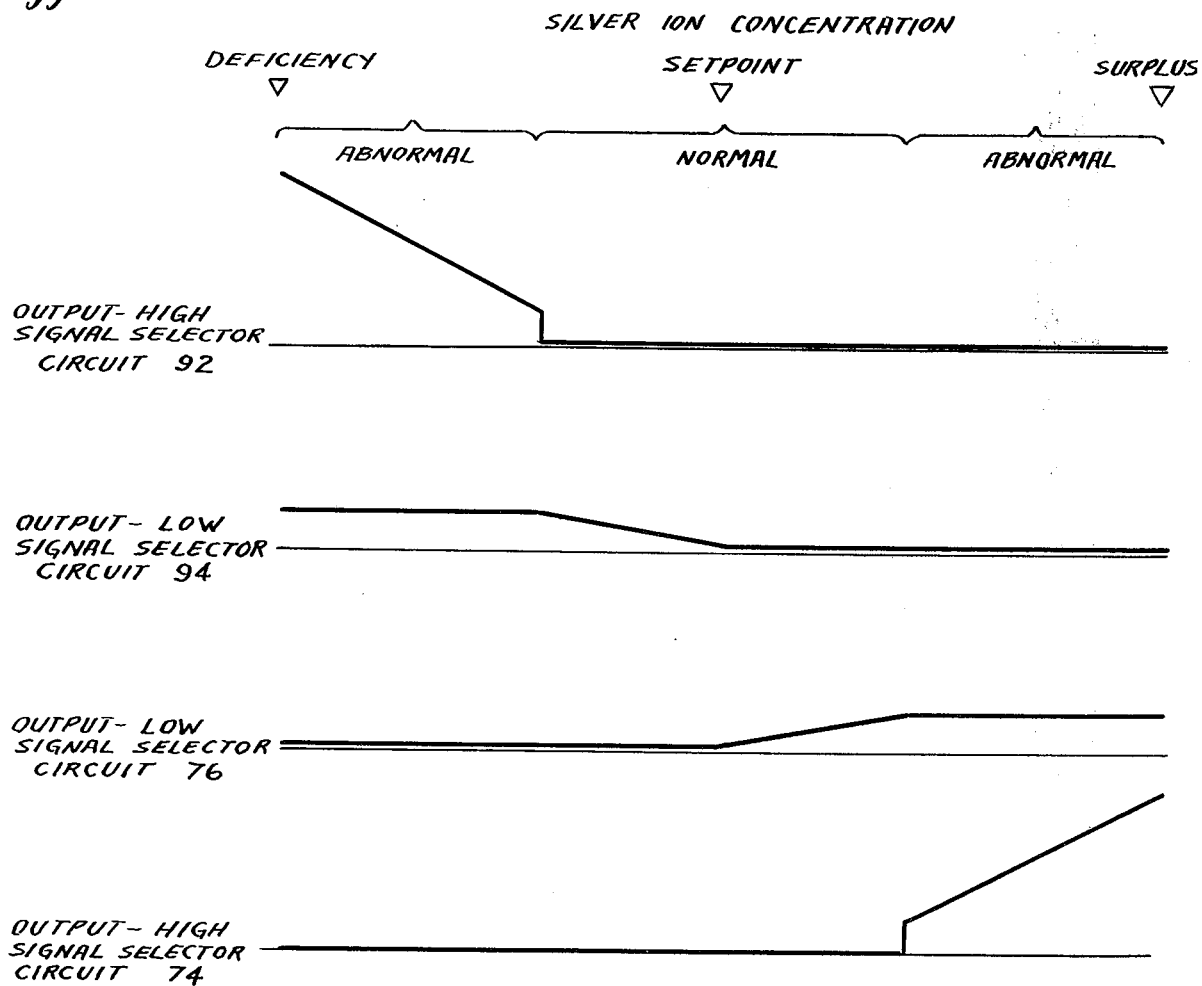

REACTANTS ADDITION AND CONCENTRATION CONTROL SYSTEM

BACKGROUND OF THE INVENTION

The present invention relates to process control systems and more particularly to means for controlling the concentration of a constituent in a product made by mixing components having differing amounts of the constituent.

Photographic emulsions can be prepared by mixing solutions of silver nitrate and alkali halide. The properties of such emulsions are, in part, a function of the defined shape, average size and size distribution of the silver halide crystals in the emulsion. To produce emulsions having desirable silver halide crystal characteristics, the silver ion concentration, acidity, flow patterns, temperature, and addition rate of the reactants must be closely controlled during the mixing operation.

One known system for controlling the addition rate of the reactants is a gravity feed system in which control valves are used to limit the rates of delivery of the silver nitrate and alkali halide solutions. In this system, a recorder is used to monitor acidity and silver ion concentration. Where a deviation from set point is sensed, the addition rates of the solutions are adjusted.

One disadvantage of such a system is that continuous variations in the primary addition rates of the reactants does nothing to enhance the overall stability of the process.

In another prior art system, the primary addition rates for the alkali halide and silver nitrate solutions are controlled by gear pumps in the primary flow paths for the solutions. The flow rate for each solution is monitored and controlled by a flow meter. Silver ion concentration is controlled in this system through the use of separate control flow paths from the reactant supply vessels to the mixing vessel.

Each control flow path includes a silver ion concentration analyzer, a gear pump and a flow meter. Where the silver ion concentration is below set point, the gear pump in the silver nitrate control flow path is energized. Conversely, where the silver ion concentration is above set point, the gear pump in the alkali halide control loop is energized. The control loops operate independently of the primary loop. Since the reactants addition rate is controlled by a gear pump, which is the only available means to adjust the flow rate, the limits to the range of motor speeds has a limiting effect on the turn-down ratio of the maximum to minimum addition rate through the control flow paths.

SUMMARY OF THE INVENTION

The present invention permits photographic emulsions or other products to be manufactured by a process during which significant disturbances in a constituent may occur and be compensated for.

Apparatus for practicing the present invention can control the concentration of a constituent of a product prepared by mixing at least one constituent-deficient component and at least one constituent-rich component in a vessel. The apparatus includes a primary flow path with first and second metering devices for establishing the primary addition rates for the constituent-deficient component and the constituent-rich component. The primary flow path also includes means for driving the first and second metering devices continuously during the mixing operation. The apparatus further includes a secondary flow path including a third metering device for delivering secondary amounts of the constituent-deficient component upon command and a fourth metering device for delivering secondary amounts of the constituent-rich component upon command. Concentration control elements of this apparatus include means for measuring the concentration of the constituent in the vessel and means responsive to any deviation within a predetermined range to energize one of the metering devices in the secondary flow path to add a secondary amount of whichever component is needed to offset the deviation. This means responds to deviations outside the predetermined range to alter the delivery rate of one of the metering devices in the primary flow loop as a direct function of the magnitude of the deviation.

DESCRIPTION OF THE DRAWINGS

While the specification concludes with claims particularly pointing out and distinctly claiming that which is regarded as the present invention, further details and advantages of a particular embodiment of the invention may be more readily ascertained from the following detailed description when read in conjunction with the accompanying drawings wherein:

FIG. 3 is a block diagram of the concentration control circuits with three controllers employed in the control of the process; and FIG. 4 is a compilation of the control signals generated over a wide range of ion concentration deviations.

DESCRIPTION OF SPECIFIC EMBODIMENTS

Figure 1:
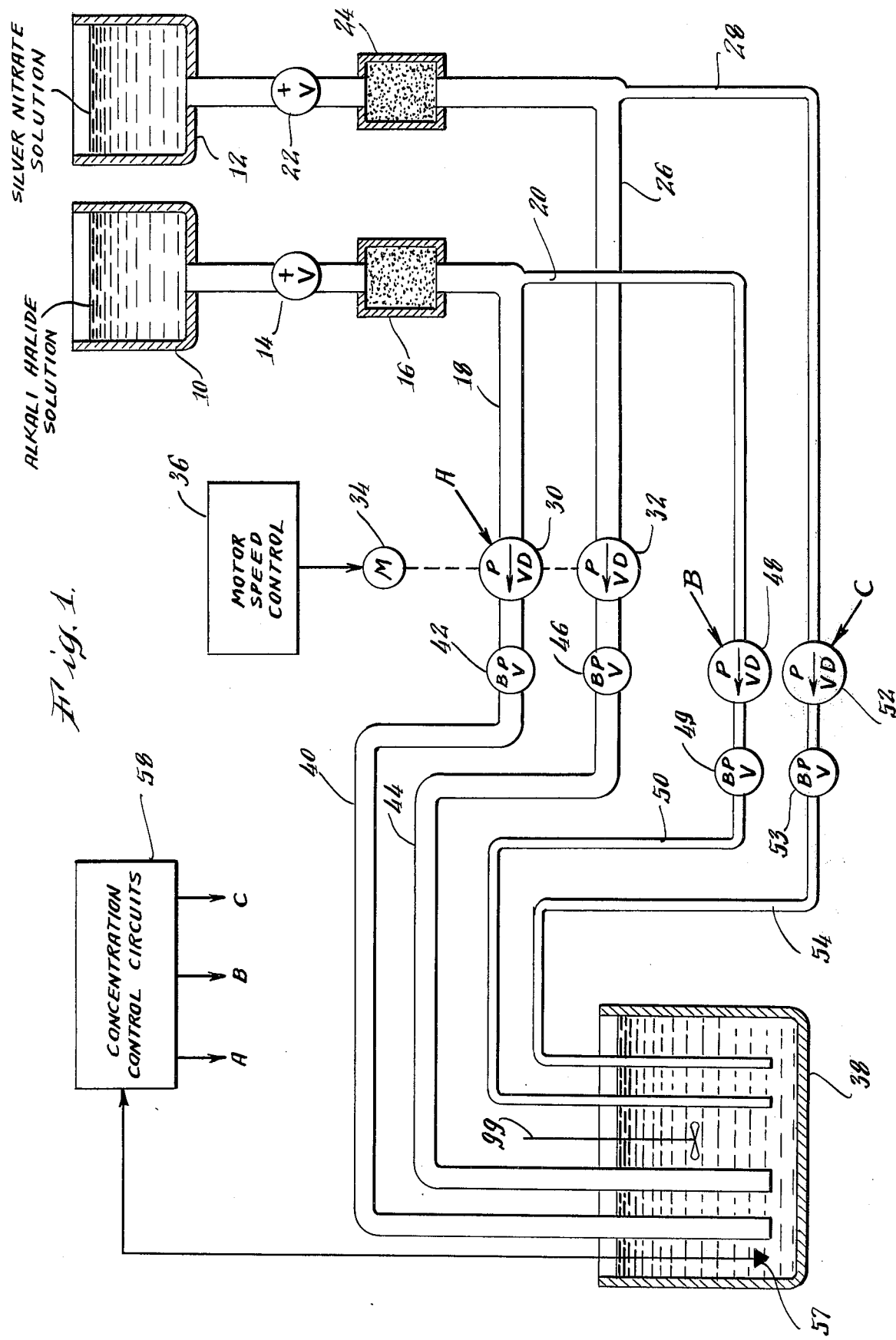
FIG. 1 is a schematic diagram of a photographic emulsion manufacturing process which incorporates the present invention.

Referring now to FIG. 1, the function of the present invention is to control the rates at which an alkali halide solution in a supply tank 10 and a silver nitrate solution in a supply tank 12 are delivered to a mixing vessel 38. The solution within the vessel 38 is continuously agitated by the mixer 99. An outlet conduit from supply tank 10 includes a tank valve 14 and a filter 16 through which the alkali halide solution is directed. Most of the filtered alkali halide solution enters a primary flow path through a conduit 18 although a small amount is diverted to a secondary flow path through a conduit 20.

The outlet connections from the supply tank 12 for the silver nitrate solution are similar to the outlet connections for the alkali halide solution. That is, an outlet conduit from the supply tank 12 includes a tank valve 22, a filter 24, a primary flow conduit 26 and a secondary flow conduit 28.

The primary addition rate for each of the solutions is established in the primary flow path by means of reciprocating metering pumps 30 and 32 in conduits 18 and 26, respectively. Each of the reciprocating metering pumps 30 and 32 is a conventional pump, and delivery rate of which can be adjusted by varying either the stroke rate or the stroke length of the reciprocating element. For example, pumps 30 and 32 could be Model SED MR 2-88-142-SM pumps available from the Milton Roy Co. of Philadelphia, Pennsylvania.

Both of the reciprocating metering pumps 30 and 32 are driven at the same stroke rate by a variable speed drive motor 34 operated by speed control circuit 36. Alkali halide solution metered by pump 30 is delivered to the mixing vessel 38 through a conduit 40 which includes a back pressure valve 42. Metered amounts of silver nitrate solution are delivered to the mixing vessel 38 through a conduit 44 having a back pressure valve 46. These valves may be ½ inches 746-033-50 valves, also available from the Milton Roy Co.

In the secondary flow path a selectively energized metering pump 48 forces secondary amounts of alkali halide solution from conduit 20 through a back pressure valve 49 to a conduit 50 terminating in the mixing vessel 38. A similar metering pump 52 regulates the secondary flow of silver nitrate solution from conduit 28 through a back pressure valve 53 to a conduit 54 which also terminates in the mixing vessel 38. Metering pumps 48 and 52 may each be a 20IV-40-43-SM Chem pump available from the Crane Co. of Warrington, Pa.

The concentration of silver ions in the mixing vessel is measured by means of a probe assembly 57 immersed in the vessel. The signals developed by this probe assembly are applied to concentration control circuits, shown as block 58, but described in more detail with reference to FIGS. 2 and 3. Where measurements indicate the silver ion concentration deviates from a setpoint or predetermined value by a relatively small amount, circuits 58 cause either metering pump 48 or metering pump 52 to be energized to deliver whichever solution is needed to offset the deviation.

Where the ion concentration disturbance is relatively large; that is, incapable of being corrected when the energized pump is running at maximum capacity, concentration control circuits 58 generate signals which alter the stroke length of reciprocating metering pump 30, thereby altering the primary addition rate for the alkali halide solution. The stroke length may either be increased or decreased to provide more or less alkali halide solution as needed to offset deviations in the silver ion concentration.

According to a preferred embodiment of the invention, only the stroke length of pump 30 is altered by the concentration control circuits 58. The stroke rate of pump 30 remains the same as that of pump 32 which is preferably not tied to the concentration control circuits.

Figure 2:
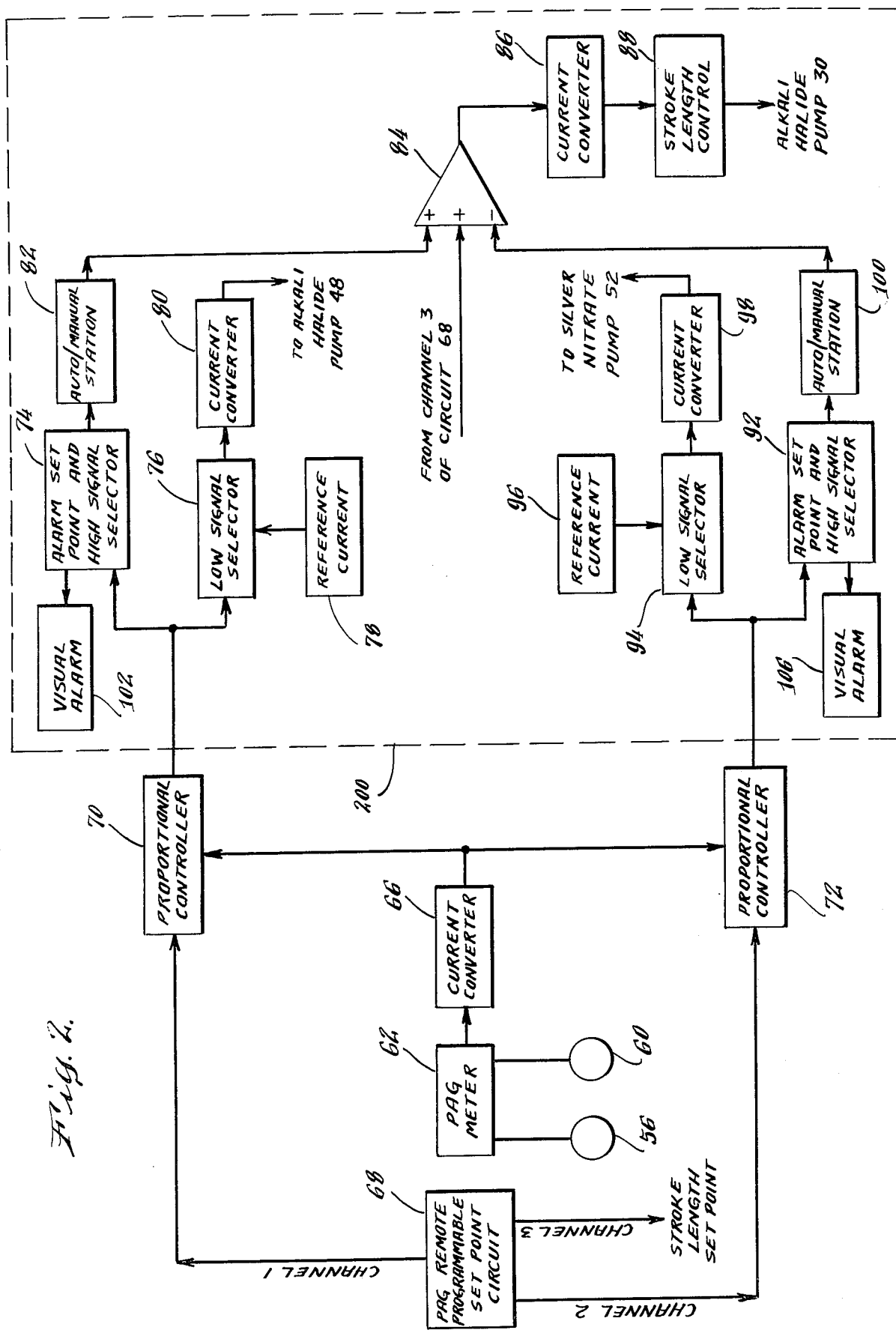
FIG. 2 is a block diagram of the concentration control circuits with two controllers employed in the control of that process.

Referring now to FIG. 2, a silver billet probe 56 and a silver/silver chloride reference probe 60 in probe assembly 57 provide input signals to a silver ion concentration meter 62 which generates a signal representing the absolute value of the silver ion concentration in vessel 38. The output of meter 62 is applied to two proportional controllers 70 and 72 through a current converter 66.

Probe 60 may be a Ag/AgCl reference probe available from Beckman Instruments Inc. of Irvine, California. Silver ion concentration meter 62 is basically a Model 900 pH analyzer also available from Beckman Instruments. Proportional controllers 70 and 72 are Model No. 62H Proportional controllers available from Foxboro Co. in Rochester, New York.

The function of the proportional controller 70 is to offset the signal representing the measured ion concentration by the magnitude of the setpoint signal to derive a concentration error signal when there is a surplus of silver ions. The magnitude of the output signals indicates the size of the deviation. The output signal of the proportional controller 70 remains at a minimum value when there is a deficiency of silver ions.

The function of the proportional controller 72 is the same as the function of the proportional controller 70 where there is a deficiency of silver ions. That is, the output signal from the proportional controller 72 is proportional to the deviation between the measured silver ion concentration and the setpoint signal when there is a deficiency of silver ions. The output signal of the proportional controller 72 remains at a minimum value when there is a surplus of silver ions.

The silver ion concentration set points for the proportional controllers 70 and 72 are preferably remotely controlled through separate channels one and two from digital data setpoint circuit 68. The output of controller 70 is applied both to a high signal selector circuit 74 and to a low signal selector circuit 76. The function of the low signal selector circuit 76 is to compare the output of proportional controller 70 with a reference signal furnished by a reference current source 78. Signal selector circuit 76 passes the lower of the two compared signals to a current converter 80. The output of current converter 80 controls the alkali halide pump 48 in the secondary flow loop.

The output of the low signal selector circuit 76 is directly related to the magnitude of the concentration error signal within a limited range, the upper boundary of which is established by the value of the reference current provided by source 78. Where the concentration error signal exceeds the reference signal, the output of low signal selector circuit 76 is a constant having the magnitude of the reference. This constant signal represents the maximum corrective capacity of the alkali halide pump 48 in the secondary flow loop.

Auto/manual station 82 is a conventional process control element which accepts instrument-generated input signals or manual input signals under the control of an operator. For purposes of this description, it is assumed that auto/manual station 82 is always operating in the automatic mode. The signal appearing at the output of high signal selector circuit 74 is passed through station 82 to one input of a summing amplifier 84, the output of which is applied to a current converter 86. The output of summing amplifier 84 provides an input to a stroke length control 88 for the alkali halide pump 30 in the primary flow loop. The primary stroke length of the alkali halide pump is remotely controlled by a digital data circuit through channel 3. The signal generated by the high signal selector circuit 74 alters the stroke length of the alkali halide pump 30 slightly to increase the primary addition rate of the ion alkali halide solution thereby reducing the silver ion concentration in the vessel. The stroke length controller 88 is preferably a TAMR Actuator with AMI-MA control available from the Milton Roy Co.

The high signal selector circuit 74 with its internal reference current source is part of a system for correcting large errors in the ion concentration. For ease of description, large errors; i.e., errors which cannot be corrected primarily through use of the secondary flow loop only, are referred to as abnormal errors. Errors which can be corrected through use of the secondary flow loop are described as normal errors. During a typical emulsion manufacturing process, both normal and abnormal errors may be expected to occur. Most errors will, of course, be in the normal range. The operation of the concentration control circuit in correcting abnormal errors is described in more detail later.

When the output of the PAg meter 62 indicates a deficiency of silver ions, the output of proportional controller 72 is applied to a high signal selector circuit 92 and to a low signal selector circuit 94. The low signal selector circuit 94 compares the output of proportional controller 72 with a reference signal provided by source 96, passing the lower of the two signals to a current converter 98. The output of current converter 98 controls the energization of the silver nitrate pump 52 in the secondary flow loop. The low signal selector circuit 94 provides a control signal to the silver nitrate pump 52 which is linearly related to the magnitude of concentration within the normal error range, the upper limit of which is set by the reference signal generated by source 96.

The output of high signal selector circuit 92 is applied to an auto/manual station 100 which, when operating in its automatic mode passes the signal to a negative input to the summing amplifier 84. The resulting output from summing amplifier 84, after conversion in the current converter 86, is applied to the stroke length control 88 to decrease the stroke length of the alkali halide pump 30 in the primary flow loop.

The control elements described above, including the low signal selector circuits 76 and 94 can correct only a limited or normal range of ion concentration errors. Where a concentration is abnormal; i.e., outside this range, the high signal selector circuits 74 and 92 are brought into operation.

Whenever the signal from the PAg meter 62 indicates a surplus of silver ions, an output from proportional controller 70 is compared to an output from an internal reference current source in the high signal selector circuit 74. This circuit passes the higher signal. The minimum output signal from the high signal selector signal 74 is established by the internal reference current source with the output of high signal selector circuit 74 being directly related to any higher output from proportional controller 70. The selected signal is applied to auto/manual station 82 and to an alarm circuit 102 which notifies the process operator that an abnormal concentration error has been detected. The output from the auto/manual station 82, when applied through summing amplifier 84, converter 86, and the stroke length control 88, increases the stroke length of the alkali halide pump 30 in the primary flow loop.

Since the output of the high signal selector circuit 74 is directly related to the magnitude of the abnormal concentration error, the stroke length of the alkali halide pump 30 is changed linearly over a nearly unlimited range to alter the primary addition rate of the alkali halide to whatever extent is necessary to correct the abnormal concentration error.

Where the output of the PAg meter 62 indicates an abnormal deficiency of silver ions, high signal selector circuit 92, after comparing the output from proportional controller 72 to a reference current provided by an internal source, causes an alarm 106 to be energized. The output of the high signal selector circuit 92, when applied through auto/manual station 100, summing amplifier 84, and current converter 86, also causes the stroke length of the alkali halide pump 30 to be decreased in direct relation to the magnitude of the abnormal concentration error. The decrease in the primary addition rate of the alkali halide will offset the deficient silver ion concentration.

FIG. 3 shows an alternate approach to controlling the silver ion concentration. A silver billet probe 55 and a silver/silver chloride reference probe 61 provide input signals to a silver ion concentration meter 63 which generates a signal representing the absolute value of the silver ion concentration in vessel 38. The output of meter 63 is applied to a three mode controller 65 through a current converter 67 which converts the meter output current to a magnitude and form usable by the three mode controller. In one embodiment of the invention, a silver ion concentration remote programmable set point circuit 69 provides an input signal to the three mode controller 65 representing the desired value of the silver ion concentration. Controller 65 is preferably a Model No. 62H proportional, reset and derivative controller available from Foxboro Company.

The function of the three mode controller 65 is to offset the signal representing the measured ion concentration by the magnitude of the setpoint signal to derive a concentration error signal having a polarity indicating whether there is a surplus or a deficiency of silver ions and a magnitude indicating the size of the deviation.

The concentration error signal is applied to a pair of proportional controllers 71 and 73 which provide signals linearly related to the magnitude of the error. Where the silver ion concentration is above the setpoint, the control elements associated with proportional controller 71 are energized, and when the silver ion concentration is below the setpoint, the control elements associated with proportional controller 73 are energized.

The output signals from the proportional controllers 71 and 73 are applied to a set of components identical to those appearing within dotted outline 200 in FIG. 2.

Idealized representations of the signals provided by selector circuits 74, 76, 92, 94 appear in FIG. 4. Where the probes and meter indicate an abnormal deficiency of silver ions, the output of high signal selector circuit 92 jumps to the internal reference current value and then increases in relation to the absolute magnitude of the deviation from set point. The greater the deficiency, the greater the magnitude of the control signal. The output of selector circuit 92 reaches a minimum level at the breakpoint between the normal error range and the abnormal error range and remains at that level for any lesser errors. The output of the low signal selector circuit 94 is a fixed maximum for any deficiencies in the abnormal range but is linearly related to errors in the normal range.

Similarly, the output of low signal selector circuit 76 is linearly related to normal surpluses of silver ions but is a constant signal for abnormal surpluses. Abnormal surpluses result in the generation of a directly-related, linear signal from a high signal selector circuit 74.

The breakpoints between the normal and abnormal error ranges are determined by the values of the reference signals provided by reference current sources shown in FIG. 2. The signals illustrated in FIG. 4 are based on an assumption that sources associated with proportional controller 70 generate the same reference signal and that sources associated with proportional controller 72 also generate identical references signals.

While there has been described what are considered to be preferred embodiments of the present invention, variations and modifications therein will occur to those skilled in the art. Therefore, it is intended that the appended claims shall be construed to include all such variations and modifications as fall within the true spirit and scope of the invention.

What is claimed is:

1. Apparatus for controlling the concentration of a constituent of a product prepared by mixing a constituent-deficient component and a constituent-rich component in a vessel comprising:
   a primary flow loop including
     first and second metering devices for establishing primary addition rates for the constituent-deficient component and the constituent-rich component respectively; and
     means for driving said first and second metering devices continuously during the mixing operation;
   a secondary flow loop including
     a third metering device for delivering secondary amounts of the constituent-deficient component to the vessel upon command;
     a fourth metering device for delivering secondary amounts for the constituent-rich component to the vessel upon command; and
   concentration control means comprising;
     means for measuring the concentration of constituent in the vessel to establish any deviation from a predetermined setpoint; and
     means responsive to deviations within a predetermined range to energize one of said metering devices in the secondary flow loop to add whichever component is needed to reduce the deviation, said means being responsive to deviations outside the predetermined range to change the setting of one of the metering devices in the primary flow loop so as to alter at least one primary addition rate as a function of the magnitude of the deviation.

2. Apparatus as recited in claim 1 wherein each of said first and second metering devices comprises a reciprocating metering pump, the delivery rate of which may be adjusted by altering the stroke rate or the stroke length.

3. Apparatus as recited in claim 12 wherein said driving means comprises a motor for driving the first and second reciprocating metering pumps at the same stroke rate.

4. Apparatus as recited in claim 3 wherein said deviation responsive means changes the stroke length of one of said first and second reciprocating metering pumps to alter the primary addition rate of one component.

5. Apparatus as recited in claim 4 wherein said deviation responsive means comprises:
   a first reference signal source;
   a first signal selecting circuit for passing the lesser of the absolute values of the first reference and a surplus-indicating deviation signal to said third metering device;
   a second reference signal source; and
   a second signal selecting circuit for passing the lesser of the absolute values of the second reference signal and a deficiency-indicating deviation signal to said fourth metering device.

6. Apparatus as recited in claim 5 wherein said deviation responsive means further comprises:
   a third reference signal source;
   a third signal selecting circuit for passing the absolute values of the deviation signal when the deviation signal is greater than the third reference signal and the deficiency-indicating deviation signal to one of said first and second reciprocating metering pumps to decrease the stroke length of that pump;
   a fourth reference signal source; and
   a fourth signal selecting circuit for passing the absolute values of the deviation signal when the deviation signal is greater than the fourth reference signals and the deviation signal to the same one of said first and second reciprocating metering pumps to increase the stroke length of the pump.

7. Apparatus for controlling the concentration of silver ions in photographic silver halide emulsions prepared by mixing an alkali halide solution and silver nitrate solution in a vessel comprising:
   a primary flow loop control including
     first and second metering pumps for establishing primary addition rates for the alkali halide and silver nitrate solutions respectively, and
     means for driving said first and second metering pumps continuously during the mixing operation;
   a secondary flow loop including
     a third metering pump for delivering secondary amounts of alkali halide solution to the vessel upon command, and
     a fourth metering pump for delivering secondary amounts of silver nitrate solution to the vessel upon command; and
   concentration control means comprising means for measuring the silver ion concentration in the vessel to establish any deviation from a predetermined ion set point, and
   means responsive to ion concentration deviations within a predetermined range to energize one of the metering pumps in the secondary flow loop and add the solution which reduces the deviation, said means being responsive to ion concentration deviations outside the predetermined range to alter the primary addition rate of one of the metering pumps in the primary flow loop in proportion to the magnitude of the deviation.

8. Apparatus as recited in claim 7 wherein each of said first and second metering pumps comprises a reciprocating metering pump, the delivery rate of which may be adjusted by changing the stroke rate or the stroke length.

9. Apparatus as recited in claim 8 wherein said driving means comprises a motor for driving said first and second metering pumps at the same stroke rate.

10. Apparatus as recited in claim 9 wherein said deviation responsive means responds to abnormal deviations in ion concentration by altering the stroke length of one of said first and second metering pumps.

11. Apparatus as recited in claim 10 wherein said deviation responsive means comprises;
   a first reference signal source;
   a first signal selecting circuit for passing the lesser of the absolute values of the first reference signal and a surplus-indicating deviation signal to said third metering device;
   a second reference signal source; and
   a second signal selecting circuit for passing the lesser of the absolute values of the second reference signal and a deficiency-indicating deviation signal to said fourth metering device.

12. Apparatus as recited in claim 11 wherein said deviation responsive means further comprises:
   a third reference signal source;
   a third signal selecting circuit for passing the absolute value of the deviation signal when the deviation signal is greater than the third reference signal and a deficiency-indicating deviation signal to said first reciprocating metering pump to decrease the stroke length of that pump; and a fourth reference signal source; and a fourth signal selecting circuit for passing the absolute value of the deviation signal when the deviation signal is greater than the fourth reference signal and a surplus-indicating deviation signal to said first reciprocating metering pump to increase the stroke length of that pump.

13. A method of controlling the concentration of a constituent of a product prepared by mixing a constituent-deficient component and a constituent-rich component in a vessel comprising the steps of:

establishing a primary addition rate at which each component is continuously delivered to the vessel during the mixing operation;

measuring the concentration of the constituent in the vessel during the mixing operation to determine whether the concentration deviates from a predetermined value;

intermittently supplying to the vessel secondary amounts of the component required to reduce the deviation where the deviation falls within the predetermined range; and altering the primary addition rate of one of the components as a direct function of the deviation where the deviation falls outside the predetermined range.

14. A method as recited in claim 13 wherein a primary addition rate of one of the components remains fixed while the primary addition rate of the other is increased or decreased as needed.

15. A method of controlling the concentration of silver ions in a photographic silver halide emulsion prepared by mixing an alkali halide solution and a silver nitrate solution in a vessel comprising the step of;

establishing primary addition rates at which the alkali halide solution and the silver nitrate solution are continuously delivered during the mixing operation;

measuring the silver ion concentration to establish any deviation from a predetermined set point;

intermittently supplying to the vessel secondary amounts of whichever solution is required to reduce the deviation where the deviation is within a predetermined range; and altering the primary addition rate of one of the solutions as a direct function of the deviation where the deviation is outside the predetermined range.

16. A method as recited in claim 15 wherein the primary addition rate of one of the solutions remains fixed while the primary addition rate of the other is increased or decreased as needed.

17. A method as recited in claim 16 wherein the primary addition rate of the alkali halide solution is increased or decreased as needed to offset abnormal deviations in the silver ion concentration.

* * * * *